United States Patent [19]

Kolish et al.

[11] 3,978,015

[45] Aug. 31, 1976

[54] THREE COMPONENT ELECTRODEPOSITION SYSTEM

[75] Inventors: Bernard L. Kolish, Raritan, N.J.; Wesley K. Senseman, Cleveland Heights; Clayton H. Konker, Euclid, both of Ohio

[73] Assignee: Mobil Oil Corporation, New York, N.Y.

[22] Filed: Apr. 5, 1971

[21] Appl. No.: 131,418

[52] U.S. Cl. .................. 260/29.4 UA; 204/181; 260/850; 260/851; 260/855; 260/856
[51] Int. Cl.² ...................................... C08L 61/20
[58] Field of Search ............... 260/29.4 UA, 29.4 R, 260/850, 855, 851, 856; 204/181

[56] References Cited
UNITED STATES PATENTS

| | | | |
|---|---|---|---|
| 3,267,174 | 8/1966 | Fry et al. | 260/29.3 |
| 3,403,088 | 9/1968 | Hart | 204/181 |
| 3,471,388 | 10/1969 | Koral | 204/181 |
| 3,492,252 | 1/1970 | Euchner et al. | 260/29.3 X |
| 3,616,394 | 10/1971 | Koepke et al. | 204/181 |
| 3,657,384 | 4/1972 | Yoshida et al. | 204/181 |
| 3,663,401 | 5/1972 | Christenson et al. | 204/181 |

*Primary Examiner*—Lorenzo B. Hayes
*Attorney, Agent, or Firm*—Charles A. Huggett

[57] ABSTRACT

Emulsion electrocoat systems are provided in which a non-water dispersible resinous polyol is emulsified in the aqueous phase by means of an hydroxy functional emulsifying agent and an aminoplast resin is also present for cure. Superior corrosion resistance is obtained by having hydroxy functionality available in both the emulsified phase and in the emulsifying agent which disperses it.

12 Claims, No Drawings

THREE COMPONENT ELECTRODEPOSITION SYSTEM

The present invention relates to the electrophoretic deposition of organic resinous coatings from aqueous medium and is particularly directed to three component aqueous systems which electrodeposit coatings possessing superior resistance to corrosion.

Electrophoretic deposition is commonly practiced by dispersing a carboxy-functional resin in water with the aid of a base. The base forms a salt with the resin and the salt dissociates in the water to form polyanionic resin particles. A unidirectional electrical current is then passed through the aqueous dispersion and through the object to be coated as the anode to cause the dispersed resin particles to be propelled onto the anode and insolubilized thereon as a coating. The same action occurs when an amine-functional resin is dispersed in water with the aid of an acid, but this time polycationic resin particles are formed and the unidirectional electrical current propels the resin onto the cathode. The anodic deposition has found commercial acceptance, and the invention is especially applicable to it, but cathodic deposition is also of interest and this invention is also applicable to such systems.

Using the better known anodic deposition system as illustrative, the carboxy-functional resin which is used cannot itself possess the desired superior chemical and physical properties, because the molecular weights, composition, and low carboxy functionality needed for these properties would prevent water dispersibility, even with the aid of a base. As a result, it has been found necessary to use curable resins and to cure such resins after deposition with an aminoplast resin, but this has not been simple and the cure has not contributed all of the corrosion resistance which was desired.

Emulsion systems have also been employed. In the emulsion system, a non-water dispersible resin is suspended in the form of discrete emulsion particles by means of a resinous polycarboxylic acid emulsifying agent, this agent being present as a solubilized salt which responds to the electrophoretic propelling force and drags the emulsified particles of non-water dispersible resin with it for codeposition at the anode. The use of discrete emulsion particles of non-water dispersible resin improves corrosion resistance, but even when the non-water dispersible resin is hydroxy functional and aminoplast resin is used for cure, the corrosion resistance is less than is desired.

This invention provides a three component system wherein three different resinous materials are employed in the same aqueous system for codeposition by the undirectional electrical current whereupon cure using conventional baking is able to achieve better corrosion resistance than was heretofore attainable.

Using the anodic deposition system for illustration, the aqueous dispersion which is subjected to the unidirectional electrical current comprises three resinous materials dispersed in water, usually with the aid of water miscible organic solvent these resinous materials are:

1. a non-water dispersible resinous polyol, this resinous polyol being emulsified in the aqueous phase of the system by means of component (2) noted below:
2. a resinous polycarboxylic acid emulsifying agent containing hydroxy functionality; and
3. an aminoplast resin.

In this invention, the non-water dispersible resin and the resinous polycarboxylic acid emulsifying agent which maintains it in emulsified form are both hydroxy functional. When both of these resins are simultaneously electrodeposited with an aminoplast resin and the mixture baked, then the two different hydroxy functional resins integrate one with the other to provide a more corrosion-resistant coating than has heretofore been obtained by prior art procedures. As will be more specifically pointed out hereinafter, when the non-water dispersible resin is omitted from the combination system, then salt fog corrosion resistance is significantly impaired, the chemical resistance as determined by exposure to detergent at elevated temperature is markedly reduced, the throwing power of the electrodeposition system is badly degraded and the deposited coating is relatively inferior to the coatings obtained by the resins of the invention (on zinc die cast, for example). When the non-water dispersible resin is used, but the hydroxy groups are omitted from the emulsifying agent and the mixture of resins is electrodeposited with an aminoplast resin and then baked, then the corrosion resistance of the baked coating is relatively inferior to the coatings obtained when the resins of the invention are used.

Stated generically, the aqueous emulsions in this invention comprise a non-water dispersible resinous polyol emulsified in the aqueous phase of the emulsion by means of a resinous hydroxy functional emulsifying agent. The resin of the emulsifying agent will include salt forming groups which may be either carboxylic acid groups or amino groups, and the emulsifying agent is used in the invention in the form of a salt dissociated in the aqueous phase of the emulsion. The emulsion will further include aminoplast resin for curing the emulsifying agent and the polyol by reaction with the hydroxy groups thereof, It will be understood that when the emulsifying agent dissociates in the aqueous phase, it will generate a polyanionic resin if the salt forming groups are carboxylic groups or a polycationic resin if the salt forming groups are amino groups. The anionic or cationic nature of the resin will determine the direction of electrophoretic movement in a unidirectional electrical current and this will determine which electrode will be coated. While the invention embraces both anodic deposition and cathodic deposition, anodic deposition is especially preferred and the invention will be illustrated with particular reference to anodic deposition which is obtained when the resinous hydroxy functional emulsifying agent is a polycarboxylic acid reacted with a base for salt formation, the salt dissociating in the aqueous phase of the emulsion to provide polyanionic particles which migrate to the anode of the electrical system which is used.

Referring first to the non-water dispersible resinous polyol which is emulsified in the aqueous phase of the composition, the specific chemical composition of this resinous polyol is of secondary significance so long as it contains so little acid (or none at all) that it will not disperse by itself in water with the aid of a base. Preferred resinous polyols are thermoplastic per se under normal baking conditions. Various resins of this type are available such as copolymers of styrene and allyl alcohol having an allyl alcohol content of from 3–50 percent, preferably from 10–30 percent. Epoxy esters are also useful such as diglycidyl ethers of bisphenol A having a molecular weight of from 300–4000, preferably from 500–2000, the epoxy functionality of which has been consumed by adduction with a fatty acid such as soya fatty acid or linseed fatty acid. Hydroxy functional cycloaliphatic resin esters can also be used such as those made from Union Carbide Corporation's Polycyclol 4200. Hydroxy functional polyesters are also useful, especially those with minimal acidity, e.g., an acid number of less than 20. These are illustrated by polyesters of 3 equivalents of trimethylol propane with 2 equivalents of phthalic anhydride. Hydroxy functional acrylic copolymers are also useful, again with very little acidity so as to insure that the copolymer remains as a separate emulsified phase. These are illustrated by copolymers of 10% hydroxy ethyl acrylate, 40% methyl methacrylate and 50% ethyl acrylate. Regardless of the chemical nature of the polyol, it is preferred that it have an hydroxy value of at least 20, preferably at least 40. Also, and in preferred practice, the hydroxy groups are substantially the only functional groups available in the resin except for ethylenic unsaturation which may be present.

The non-water dispersible resinous polyol may be partially esterified with fatty acids containing from 12–22, preferably from 16–20 carbon atoms. Both saturated and unsaturated fatty acids are useful such as the fatty acids derived from linseed oil, cottonseed oil, or dehydrated castor oil. Thus, a styrene-allyl alcohol copolymer containing 6% of the hydroxy group can be esterified with sufficient linseed fatty acids to esterify half of the hydroxy groups present.

Still other resinous polyols which may be used are illustrated by vinyl copolymers containing hydrolyzed or saponified vinyl acetate such as a copolymer of 87% vinyl chloride and 13% vinyl acetate hydrolyzed to provide 6% by weight of the hydroxy group in the form of vinyl alcohol. Similarly, copolymers containing 5–25% of copolymerized hydroxy monomer such as 2-hydroxyethyl acrylate or allyl alcohol may be used. Even raw castor oil or its hydroxy functional derivatives may be used.

Referring to the resinous polycarboxylic acid emulsifying agent which contains hydroxy functionality, these may be constituted by any relatively low molecular weight resin which includes sufficient salt forming groups to enable substantial solubilization of the resin in water with the aid of a base and thereby provide emulsifying capacity, and hydroxy functionality for subsequent cure. An hydroxy value of at least 20, preferably at least 40, is preferred. When the salt forming groups are carboxyl groups, the resin should have an acid number of at least 30, preferably at least 60. A corresponding amine content should be used when the amino group is the salt forming group.

The preferred materials are thermoplastic copolymers of monoethylenic monomers with the acid number resulting from the incorporation of at least about 5% by weight of a monoethylenic acid, such as acrylic acid or methacrylic acid, or from the addition reaction of a polycarboxylic acid monoanhydride, such as trimellitic anhydride, with some of the hydroxy groups in the polymer. Similarly, the hydroxy functionality may be provided by the incorporation of at least about 3% by weight of a monoethylenic hydroxy compound, such as hydroxy ethyl methacrylate or hydroxy propyl butyl maleate, or by the addition reaction of a monoepoxide such as butylene oxide with carboxyl functionality in the polymer.

As a feature of the invention, the desired hydroxy functionality is obtained by utilizing copolymers containing an ally alcohol or a monoallyl ether of a polyhydric alcohol, such as trimethylol propane monoallyl ether, in place of the more conventional hydroxy alkyl esters of alpha, beta-ethylenically unsaturated carboxylic acids. Other allylic hydroxy compounds which may be used are methallyl alcohol and the monoallyl ether of ethylene glycol. Normally, allylic compounds do not copolymerize well with acrylic esters and like alpha, beta-ethylenically unsaturated monomers since the allylic compound has a tendency to cause degradative chain transfer making it difficult to obtain copolymers possessing good film properties. However, it is found in the aqueous systems of this invention that the allylic compound can be used, and the corrosion resistance desired is still obtained, especially when the allylic ethers are used.

Acrylic copolymers are particularly preferred, this term denoting the presence of at least about 20% by weight of the copolymer of an ester of acrylic acid, methacrylic acid, or crotonic acid, but preferably acrylic acid, or methacrylic acid.

The aminoplast resins which are useful in this invention are subject to wide variation. As is well known, heat-hardening amine-aldehyde reaction products, especially with formaldehyde are well known for the cure of hydroxy functional resins. Melamine and substituted melamines are especially desirable for this purpose when condensed with formaldehyde.

The aminoplast may be etherified with methanol to induce water solubility and these water soluble ethers such as hexamethoxy methyl melamine are useful in this invention, but are not preferred since they deposit at a slower rate than the other resins used herein. It is preferred instead to employ aminoplast resins which are not soluble in the aqueous phase of the emulsion and which, therefore, exhibit superior electrical transport characteristics, e.g., they deposit more in proportion to their concentration in the mixture of resins used.

The water insoluble aminoplast resins may be of diverse type including water dispersible materials which are etherified by a mixture of methanol and one or more $C_2$–$C_4$ alcohols as described in U.S. Pat. No. 3,471,388, a butylated methylated hexamethylol melamine having a mol ratio of 1 mol melamine:5.8 mols formaldehyde:3.0 mols methanol:2.5 mols butanol being illustrative. Another type of water insoluble aminoplast resin is the ordinary heat hardening solvent soluble aminoplast which is neither water soluble nor water dispersible and these may be dissolved in the emulsified oil phase of the aqueous system in accordance with this invention.

From the standpoint of proportions, the aminoplast resin may constitute from 5–50 percent of the mixture, preferably 10–35 percent; the non-water dispersible polyol may range from 15–50 percent, preferably from 25–45 percent; and the hydroxy functional emulsifying agent will also be employed in amounts of from 15–50 percent, preferably from 25–45 percent, all of these percentages being based on the total weight of nonvolatile vehicle. In preferred practice, the non-water dispersible polyol and the hydroxy functional emulsifying agent will be used in a weight ratio of from 2:1 to 1:2, and most preferably in a ratio of about 1:1.

As will be appreciated, the non-water dispersible polyol is intended to be maintained in the form of discrete emulsion particles which are chemically remote from the materials in the aqueous phase of the emulsion. The separation of the two phases in the emulsion as well as subsequent flow of the deposited film is facilitated or enhanced by the presence of small proportions of organic solvents, especially those of only limited water miscibility. Preferred solvents for this purpose are aromatic hydrocarbons such as toluene or xylene as well as commercial mixtures thereof. On the other hand, and particularly if it is desired to minimize or eliminate aromatic hydrocarbons, water insoluble alcohols such as iso-octyl alcohol may be used. The water immiscible organic solvent is desirably employed in an amount of at least 5% by weight, based on the weight of the non-water dispersible polyol.

It is also desirable to employ water miscible organic solvents since these help to facilitate dispersion of the emulsifying agent in the aqueous phase. These water miscible organic solvents are well known for this purpose and are illustrated by methyl ethyl ketone, 2-ethoxy ethanol, 4-methoxy-4-methyl pentanone-2, and the like.

As is also known in the electrocoating art, the base which is used for salt formation is subject to considerable variation, volatile nitrogenous bases being usually preferred. Thus, ammonia is quite useful, but volatile aliphatic amines are more commonly used such as triethyl amine or dimethyl ethanol amine, etc. Non-volatile bases are sometimes used such as sodium or potassium which may be employed in the form of an hydroxide or as an alkaline salt such as the carbonate.

The aqueous systems used in the present invention are desirably formulated to include from 5-25 percent of total solids, more preferably from 8-20 percent, and the electrocoating bath may range in pH from about 7 to about 11, but is more preferably in the range of 7.5 to 9.5. In normal practice, a voltage of from 100 to 300 volts is passed through the bath for either a predetermined period of time, e.g., from 30 seconds to 5 minutes, or until the production of a uniformly deposited resistive film reduces the current flow to a predetermined extent.

As previously indicated, this invention has been described by reference to the better known anodic deposition systems, but it is also applicable to the cathodic deposition systems. Here, one would employ the same aminoplast resin and the same non-water dispersible polyol, but the resinous polycarboxylic acid emulsifying agent which contains hydroxy functionality is modified so as to replace the carboxy groups with amine groups. Thereafter, instead of using an amine for solubilization, the amine is replaced by an acid which may be organic or inorganic, e.g., sulfuric acid as illustrative of inorganic acids, and acetic acid as illustrative of organic acids.

To more specifically illustrate the hydroxy functional resinous emulsifying agent which contains amino salt forming groups, these may correspond precisely with the corresponding polycarboxylic acid emulsifying agents, replacing the acid component with a corresponding proportion of an amine. To illustrate, if the polycarboxylic acid emulsifying agent includes 10% by weight of copolymerized methacrylic acid, then the methacrylic acid can be replaced with dimethyl amino ethyl methacrylate.

Thus, and from the generic standpoint, the resin of the emulsifying agent will include carboxyl groups or amino groups, these being salt forming groups which react with acids or bases, generically termed resin dispersal assistants, to form salts which dissociate in the aqueous phase of the emulsion to form polyionic resins which are electrophoretically propelled by a unidirectional electrical current to deposit at the appropriate electrode.

The invention is illustrated in the following Example in which, as well as elsewhere herein, all proportions are by weight unless otherwise specified.

EXAMPLE

Preparation of Electrocoating Enamel

An off-white electrocoating enamel is prepared utilizing three resins as follows (on a vehicle solids basis):

(1) 38.5% styrene-allyl alcohol copolymer containing 6% of the hydroxy group;

(2) 38.5% of the hydroxy-functional polycarboxylic acrylic copolymer emulsifying agent (see Note 1); and (3) 23% butylated methylated hexamethylol melamine (1 mol melamine:5.8 mols formaldehyde; 3 mols methanol;2.5 mols butanol).

Note 1 — A copolymer of 45.6% styrene, 29.8% 2-ethylhexyl acrylate, 11.9% acrylic acid, and 12.7% hydroxyethyl methacrylate. This copolymer is provided in a 55% solids solution in a solvent mixture constituted by 66% 4-methoxy-4methyl pentanone-2, and 34% xylene. This 55% solids solution has a Gardner-Holdt viscosity of $Z_2$ and an acid number of 88.

25.33 pounds of the solvent solution of the hydroxy functional polycarboxylic acrylic copolymer identified in Note 1 are ground together with 1.78 pounds dimethyl ethanol amine, 18.76 pounds of deionized water, and 112.85 pounds of titanium dioxide rutile. The grinding is continued until a North Standard grind fineness of 7 is reached. This uniformly ground mixture is set aside for later addition.

In a separate vessel, there is mixed with a high speed mixing device, 95.50 pounds of the above styrene-allyl alcohol copolymer (Monsanto product RJ-100 may be used here if desired) and 141.56 pounds of the solvent solution of acrylic copolymer of Note 1. High speed mixing is continued until the temperature exceeds 180°F. and a smooth mixture is formed. 57.13 pounds of the above water dispersible melamine resin are then added and mixed in thoroughly whereupon 5.25 pounds of dimethyl ethanol amine are added and mixing is continued at a somewhat slower rate until a uniform admixture of all components is obtained. 435.84 pounds of deionized water are then added slowly while the mixture is agitated at high speed. There is then added, with slow agitation, the mixture of acrylic copolymer, amine, water and titanium dioxide which was previously prepared and set aside.

There are then added in the form of tinting pastes, 12.1 pounds of talc, 1.03 pounds of Ferrite Yellow and 0.05 pounds carbon black in order to provide the shade and appearance which are desired.

The foregoing provides an aqueous emulsion having a total solids content of about 40 percent (of which 33 percent is pigment and 67percent vehicle).

An electrocoating bath is formulated utilizing one volume of the above-prepared aqueous emulsion diluted with two volumes of deionized water. This provides an electrocoating bath having a pH of about 8.4 and a solids content of about 14percent. Electrodeposition is carried out at the anode utilizing a voltage of 150 volts applied for 1 ½ minutes. Films are deposited on phosphate treated steel and zinc die castings. The deposited films are cured by baking in two stages, the first stage being by baking for 20 minutes at 275°F., and the second stage being by baking for 20 minutes at 375°F. If desired, however, the films may be cured by baking the same in a single operation, e.g., for 30 minutes at 375°F.

The cured films have a pencil hardness of 2H, and possess good solvent resistance (good resistance to naphthas and xylol, and fair to good resistance to methyl ethyl ketone). They have a thickness in the range of from 0.75 to 1.0 mil.

To illustrate the improvement obtained by this invention, the emulsion of the present example is compared with a similar system in which the emulsion phase is omitted, 70% by weight of the copolymer containing hydroxy ethyl methacrylate and acrylic acid described before being blended with 30 % by weight of the same butylated methylated hexamethylol melamine. The following results are obtained.

Comparison of Performance

| Area of Improvement | (70% Acrylic) (30% Melamine) | (38.5% Acrylic) (38.5% Resinous polyol) (23% Melamine) |
|---|---|---|
| Salt Fog Corrosion Resistance Test on Phosphated Cold Rolled Steel | Pass 150 Hours Fail 200 Hours | Pass 300 Hours |
| Chemical Resistance (1% Tide at 165° F.) | Fail 24 Hours | Pass 200 Hours |
| Throwing Power (Tube Test) | 1½ – 2" (15–20%) | 7" (70%) |
| Improved Electro-deposition Characteristics | Does not give an acceptable coating on zinc die cast | Coats both cold rolled steel and zinc die cast acceptably |

The foregoing is repeated, wherein the hydroxy ethyl methacrylate bearing polymer is replaced on a weight-for-weight basis with a polymer in which the hydroxy ethyl methacrylate has been replaced with trimethylol propane monoallyl ether (on a hydroxyl equivalent basis.) Substantially the same results are obtained.

The invention is defined in the claims which follow.

We claim:

1. An aqueous emulsion adapted for electrophoretic film deposition comprising 15 –50 % of non-water dispersible resinous polyol which is thermoplastic per se and has an hydroxy value of at least 20 emulsified in the continuous aqueous phase of 15–50% of said emulsion by means of a resinous hydroxy functional polycarboxylic acid emulsifying agent, the resin of said emulsifying agent having an hydroxy value of at least 20 and an acid number of at least 30, said emulsifying agent being reacted with base to form salts which are dissociated in said aqueous phase, said emulsion further including 5–50% of aminoplast resin for curing said emulsifying agent and said polyol, said percentages all being based on the total weight of non-volatile vehicle.

2. An aqueous emulsion as recited in claim 1 in which said emulsifying agent and said polyol are present in a weight ratio of from 2:1 to 1:2.

3. An aqueous emulsion as recited in claim 2 in which said aminoplast resin is present in an amount of from 10–35 percent.

4. An aqueous emulsion as recited in claim 3 in which said emulsifying agent and said polyol are each present in an amount of from 25 –45% by weight.

5. An aqueous emulsion as recited in claim 1 in which said aminoplast resin is water insoluble.

6. An aqueous emulsion as recited in claim 1 in which said polyol is a copolymer of allyl alcohol having an allyl alcohol content of from 3–50percent.

7. An aqueous emulsion as recited in claim 6 in which said allyl alcohol copolymer further comprises styrene.

8. An aqueous emulsion as recited in claim 1 in which said emulsifying agent is a copolymer containing at least about 3% by weight of a monoethylenic hydroxy compound.

9. An aqueous emulsion as recited in claim 1 in which water immiscible organic solvent is present in the emulsified particles of resinous polyol.

10. An aqueous emulsion as recited in claim 9 in which the aqueous phase of said emulsion further includes water miscible organic solvent.

11. An aqueous emulsion as recited in claim 1 in which said emulsifying agent and said polyol are present in a weight ratio of from 2:1 to 1:2, said aminoplast resin is water insoluble, and said emulsifying agent is a thermoplastic acrylic copolymer containing copolymerized monoethylenic hydroxy compound.

12. An aqueous emulsion as recited in claim 11 in which said monoethylenic hydroxy compound is a monoallyl ether of a polyhydric alcohol.

* * * * *